ized Patent

United States Patent [19]
Sekimoto et al.

[11] 4,000,010
[45] Dec. 28, 1976

[54] ROLL AND PROCESS FOR PRODUCING SAME

[75] Inventors: Yasuhiro Sekimoto; Kazuhiko Sonomoto; Norimitsu Takano, all of Kitakyushuf, Japan

[73] Assignee: Hitachi Metals, Ltd., Japan

[22] Filed: Mar. 18, 1975

[21] Appl. No.: 559,530

[30] Foreign Application Priority Data

Mar. 29, 1974 Japan .............................. 49-34383
May 17, 1974 Japan .............................. 49-54539
Nov. 29, 1974 Japan .............................. 49-136194
Nov. 29, 1974 Japan .............................. 49-136207

[52] U.S. Cl. .............................. 148/3; 29/148.4 D; 148/34; 148/127; 148/138; 164/98; 219/73 R; 219/76
[51] Int. Cl.² .......................... C21D 9/38; C23C 1/10
[58] Field of Search ............... 148/127, 3, 138, 34; 29/148.4 D; 219/73 A, 73 R, 76; 164/98, 106, 112

[56] References Cited
UNITED STATES PATENTS

| 3,109,918 | 11/1963 | King .................................... 219/76 |
| 3,231,430 | 1/1966 | Krieger et al. ......................... 148/4 |
| 3,433,926 | 3/1969 | Dick .................................... 219/73 A |
| 3,718,956 | 3/1973 | Sekimoto et al. ............... 29/148 AD |

*Primary Examiner*—W. Stallard
*Attorney, Agent, or Firm*—Craig & Antonelli

[57] ABSTRACT

A roll and process for producing same are disclosed. This process includes the steps of: horizontally placing a core body made of a cast steel or a steel based Adamite containing from 0.5 to 2.5 %C, said core body having one or more circumferential grooves; feeding a consumable electrode wire into said groove or grooves, while rotating said core body, to thereby obtain according to an electro-slag welding process a deposited metal or metals filled in said groove or grooves, said deposited metal or metals containing from 1.5 to 2.5%C, from 0.2 to 1.0% Si, from 0.5 to 1.0% Mn, from 0.5 to 3.0 % Cr, from 0.2 to 3.0 % Mo, from 0 to 2.0 V, the balance being essentially Fe, and inevitable impurities; subjecting same to heat treatment at a temperature ranging from 500° C to 700° C; or feeding a consumable electrode wire into said groove or grooves, while rotating said core body, to thereby build-up a steel based Adamite deposited metal or metals over the surfaces of said groove or grooves to fill same according to an electro-slag welding process, the aforesaid Adamite deposited metal or metals containing from 1.5 to 2.5 % C and other suitable alloy elements and being built-up to a radial thickness ranging from 20 mm to 1/10 of the original diameter of said core body.

According to the process for producing a roll of the present invention, there is used a start-tab having a sloped top surface which rises towards the outer circumference of the core body, as viewed in its tranverse cross section, for providing a support surface for a deposited metal when starting welding, the aforesaid start-tab being made of graphite. More particularly, according to the roll producing process of the present invention, upon starting or completing the welding, the flux is converted into a molten slag by the heat from a consumable electrode wire, after which the feed of the consumable electrode wire is interrupted, and then the molten slag is maintained at a high temperature for a given period of time by using the heat from a non-consumable electrode such as tungsten or graphite, followed by the welding by the use of a consumable electrode wire.

45 Claims, 18 Drawing Figures

ROLL AND PROCESS FOR PRODUCING SAME

This invention relates to a roll and a process for producing same according to an electro-slag welding process, and more particularly to a steel based Adamite roll and a process for producing same according to an electro-slag welding process, the steel based Adamite roll having circumferential groove or grooves.

DESCRIPTION OF THE PRIOR ART

In the rolling of sections steel products such as angles or channels, a cast iron roll having high hardness is used for a finishing stand, or a tough, cast steel roll is used for a rough rolling stand. Also there has been used in some rough-rolling stand or finishing stand a roll made of a material which is referred to as a steel based Adamite having intermediate properties between that of a cast iron and that of a cast steel. Steel based Adamite corresponds in composition to a hypereutectoid steel or a hypoeutectic cast iron containing from 1.5 to 2.5%C. Included in steel based Adamite roll producing processes are one which uses heat treatment after casting and one which uses forging after casting and then heat treatment.

Since the process using casting and the subsequent heat treatment fails to present desired toughness, if resorting only to heat treatment, there has been proposed a process wherein there is used a permanent mold for atomizing the casting structure by utilizing desired heat treatment effect. However, this process suffers from shortcomings, in that there is a limitation in the cooling rate at the time of casting, and thus failing to achieve a grain size of no more than 300 $\mu$m. In particular, in the case of a large sized roll, or in the case of a roll containing alloy elements such as Ni, or Cr, there is a danger that casting-cracking will occur. Furthermore, in the case of a roll having grooves, their servicing surfaces are positioned at a significant depth from the skin of the roll cast so that the atomization of the grain size is far from satisfactory.

On the other hand according to a process, in which carbides in the structure of a roll are split by means of hot forging after casting to thereby afford toughness to the entire body of a roll, it is imperative that the contents of P, S and the like which are harmful in preventing cracking, be strictly controlled, because of the use of forging, so that the material and melting process should be strictly selected. Furthermore, in the case of the forging of a roll containing a high content of carbon, such as steel based Adamite, the forging ratio cannot be increased. As a result, in the case of a grooved roll, there may not be achieved a forging effect in the servicing surface of the groove which is at a significant depth from the surface of the roll, and in addition there results an isotropic mechanical property, because of the directional properties of carbides resulting from forging. Thus, there are problems in the wear resistance of the side walls of the grooves of the roll.

Besides the aforesaid casting or forging process, there have been proposed many other processes, such as one in which a roll is built-up or repaired, by the use of welding, one in which a specific grooved roll is built-up for reuse, and one in which a roll is produced by using a welding build-up technique. However, such welding techniques use arc welding or submerged arc welding, so that if the content of an element of a deposited metal, particularly, the content of carbon is increased, then there results a tendency to produce welding cracking. In addition, it would be impossible to build-up a deposited metal to a great thickness, because of welding-cracking or an increase in man hours resulting from poor welding efficiency, thus leaving problems in practicing such roll producing processes.

On other hand, the electro-slag welding using a consumable electrode permits build-up of a deposited metal to a great thickness, because of the use of a great heat input caused by Joule's heat in the molten slag, and thus this process has recently been utilized for welding large sized mild steel members. Although electro-slag welding has been used for the production of a roll of the type described, there has not as yet been achieved any satisfactory results.

It may be considered as an acceptable process for producing a roll according to electro-slag welding, particularly, for producing a grooved roll, that a core body having circumferential grooves is placed horizontally, and then a consumable electrode is fed into the grooves, while rotating the core body, to thereby obtain deposited metals filled in the grooves.

In addition, since electro-slag welding permits a build-up to deposited metal without causing cracking even if the carbon content is increased electro-slag welding presents considerable advantages in the production of a roll since the thickness of the built-up portion maybe increased with ease. In case a roll is produced according to the electro-slag welding, it is required that deposited metals having good weldability and excellent roll characteristics. Therefore, the selection of the composition of the deposited metals and cooling rate of the molten metal plays an important role in the production of a roll. However, such a selection poses difficulties in technology, and thus there has not been achieved a satisfactory steel based Adamite grooved roll having excellent roll characteristics, when resorting to the electro-slag welding process for producing the roll.

There has been encountered another problem in producing a grooved roll by electro-slag welding. In other words, to begin with the operation, a steel plate start-tab is secured to the surface of a groove portion in a core body in a manner to be placed in the direction of a right angle to the surface of the groove by using welding; a water cooling copper plate having the same radius of curvature as that of the steel start-tab is held at a right angle to the steel start-tab; then an arc is produced between an electrode wire and the start tab to thereby convert the flux, placed on the start tab, into a molten slag, beforehand. Then, a consumable electrode wire is melted due to the Joule's heat generated by an electric current flowing through the molten slag to thereby obtain a molten metal, after which the molten metal is cooled by means of the water-cooled copper plate to obtain a deposited metal. Since the welding-starting portion should be joined to the welding terminating portion, the start tab should be removed in the course of welding. For removing the steel start-tab, the start-tab should be fusion-cut. It follows that an imcomplete configuration of the cut is obtained, and thus it becomes difficult to smoothly build-up the terminating portion of a weld. In addition, there is a danger of the outflow of slag from a groove, presenting safety problems.

Even if the temperature of a core body is low when starting welding and hence the flux has not been converted into a high temperature slag, a consumable electrode wire should be kept to be fed, because the consumable electrode wire serves as a main electrode, as well. For this reason, incomplete penetration or fusion will result in the starting portion of a build-up welding, and hence cracking will develop therefrom. As a countermeasure against this, there have been proposed (a) injection of molten slag, (b) preheating of the core body; and (c) preparation of molten slag by means of another electrode. In the case of (a), there should be prepared a device for providing molten slag, beforehand, and if the heat capacity of the core body is great, then there results defects in the boundary between a deposited metal and a core because of the lack of heat which is given only by the molten slag. As an electrode used in the case of (c), there is proposed a tungsten or graphite rod. However, as is well known, the melting point of tungsten or graphite is extremely high, so that if it is inserted into the molten slag, it will not be consumed but maintain the molten slag at a high temperature. Accordingly, there may be achieved good penetration or fusion in the starting portion of a weld and thus poor penetration or incomplete joint may be avoided. However, the high resistance against the consuming nature of the electrode results in instable welding operation, with the accompanying shortcoming of increased man hours. Furthermore, there is another difficulty in that a tungsten or graphite rod in turn is consumed due to the heat of an arc at the time of starting welding, so that such an element will be melted into a deposited metal to thereby cause segregation in its composition, with the accompanying lack of evenness in its composition in the circumferential direction. In the case of a roll production, the above local segregation is responsible for the roughened surface of a roll.

It is a principal object of the present invention to provide a process for producing a roll by electro-slag welding, particularly, a grooved roll made of steel based Adamite and having an atomized structure plus excellent roll characteristics such as toughness, and resistance to heat cracking and wear.

It is the second object of the present invention to provide a process for producing a roll by electro-slag welding by the use of the start-tab which may be reused without a need to fusion-cut the tab and which may enhance the soundness of a weld-joint portion.

It is the third object of the present invention to provide a process for producing a roll by the electro-slag welding, which process may maintain molten slag at a high temperature at the time of starting or terminating the welding operation.

According to the present invention, the principal object may be achieved by a process for producing a roll, which comprises the steps of: horizontally placing a core body made of cast steel or steel based Adamite containing from 0.5 to 2.5%C, said core body having one or more circumferential grooves; feeding a consumable electrode wire into said grooves, while rotating said core body to thereby obtain according to the electro-slag welding process a deposited metal or metals containing from 1.5 to 2.5%C, from 0.2 to 1.0% Si, from 0.5 to 1.0% Mn, from 0.5 to 3.0 Cr, from 0.2 to 3.0% Mo, from 0 to 2.0 V and the balance being essentially Fe and inevitable impurities, over the surfaces of said grooves to fill same; or feeding a consumable electrode wire into said groove or grooves, while rotating said core body, to thereby build-up a steel based Adamite deposited metal or metals over the surfaces of said grooves to fill same according to an electro-slag welding process, the aforesaid steel based Adamite deposited metal or metals containing from 1.5 to 2.5%C and other suitable alloy elements and being built-up to a radial thickness ranging from 20 mm to 1/10 of the original diameter of the core body.

The second object of the present invention may be achieved by the process for producing a roll, in which there is used a start-tab having a sloped surface which rises towards the outer circumference of said core body, as viewed in its transverse cross section, for providing a support surface for a deposited metal, when starting welding, the aforesaid start-tab being made of graphite.

The third object of the present invention may be achieved by the process for producing a roll, wherein upon starting or completing welding, flux is converted into a molten slag due to heat from a consumable electrode wire, after which the feed of the consumable electrode wire is interrupted, and then the molten slag is maintained at a high temperature for a given period of time by using heat from a non-consumable electrode such as tungsten or graphite, followed by the welding by the use of a consumable electrode wire.

DETAILED DESCRIPTION OF PREFERRED EMBODIMENTS

Figure 1:
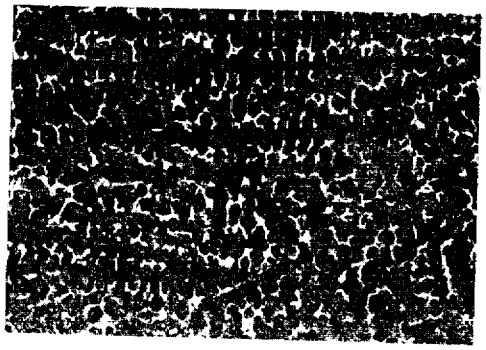
FIG. 1 is a photograph of micro-structure of sample B in Table 2.

In the production of a roll having a groove portion or portions according to an electro-slag welding, the selection of the range of composition of the core body, the range of composition of a deposited metal, the heat treatment temperature, and the cooling rate of a deposited metal play an important role.

The properties of the core body are substantially governed by the carbon content as compared with other chemical elements in the compositions of the core body. In case a high rolling load is carried by the body portion and neck portion of a roll, such as in a dual type rough rolling roll for use in a large sized steel section rolling, it is mandatory that the properties of the roll body be excellent and that the entire construction of the roll be tough for preventing its failure during the service. Whether a cast steel or steel based Adamite is used depends on the bending stress acting on the roll neck, the bending stress being stemmed from the rolling load. Particularly in the case of a high rolling load, there is used a core body made of a cast steel containing carbon content of 0.5 to 1.5%, while in the case of a moderate rolling load and hence resulting small bending stress acting on the roll neck, then there is used a core body made of steel based Adamite containing carbon of 1.5 to 2.5%. If the carbon content is not more than 0.5%, then the hardness of the core body forming the roll neck is reduced, thereby causing roughened surface in the roll neck which is fitted in a metal chock, with the resulting difficulties in its service. However, if the carbon content of the core body exceeds 2.5%, then the mechanical properties are impaired and thus the toughness is reduced, thus failing to serve as a roll for a stand which attends upon not so high load. For those reasons, the carbon content should range from 0.5 to 2.5%.

The chemical composition of the roll determines the roll characteristics such as toughness, heat cracking resistance, and wear resistance and factors arising in the production of a roll, such as castability, heat treatment, and forging adaptability. However, in case a grooved roll is produced according to the electro-slag welding, such as in the case of the present invention, it becomes necessary that the weldability of a deposited metal and the atomized structure thereof be excellent. According to the present invention, a tempering treatment is carried out at a temperature of 500° to 700° C after welding, while dispensing with the diffusion and normalizing treatments such as in the case of the production of cast and forged roll, so that whether the structure of a deposited metal obtained according to the welding is rough or fine merely governs the roll characteristics. Accordingly, the structure of the deposited metal should be fine for achieving excellent roll characteristics.

The achievement of excellent roll characteristics by resorting to the composition of a deposited metal presents imcompatibility with the weldability, and thus it is extremely difficult to meet such conflicting factors. Under these circumstancies, the inventors have given various test and study on this problem, and they have discovered a composition for a deposited metal which satisfies both the wear resistance and the requirements desired for the material to be welded. More specifically, they have discovered the composition of a deposited metal containing from 1.5 to 2.5% C, from 0.2 to 1.0% Mn, from 0.5 to 3.0% Cr, from 0.2 to 3.0% Mo, from 0 to 2.0% V, and the balance being essentially Fe and inevitable impurities. The following are the reasons for defining the above composition.

Carbon is an important element because it affords high wear resistance. If carbon content is no more than 1.5%, then there results reduced wear resistance, while the carbon content of over 2.5% produces a great amount of eutic carbides to thereby present a brittle deposited metal, with the accompanying drawbacks such as impaired resistance against heat-cracking and welding cracking. Even if vanadium is not added, there may be achieved advantages to be described hereinafter. However, if vanadium is added in amounts in proportion to the carbon content added, then there will be produced VC carbide of a fine granular form, thereby preventing welding cracking and improving wear resistance. However, in case vanadium content exceeds 2%, then the amount of VC carbide will be increased, while the amount of cementite will be decreased and the area ratio of the carbides including VC carbide will be decreased, with the result of lowered wear resistance. Silicon is added for the sake of deoxidation. If silicon content is no more than 0.2%, there may not be achieved any advantages. On the other hand, in case the silicon content exceeds 1.0%, then there results impaired toughness of a deposited metal. Manganese increases hardness, and reacts with sulfur to produce MnS, thereby preventing embrittlement due to sulfur. If manganese content is no more than 0.5%, then there may not be achieved such advantages. However, if the manganese conntent exceeds 1.0%, then there results enhanced hardenability with accompanying enhanced heat cracking tendency. Chromium combines with carbon to give carbide having high hardness and hence increases the wear resistance. If chrominum content is less than 0.5%, then there may not be achieved such advantages. On the other hand, if the chrominum content exceeds 3.0%, then there will be crystallized carbides of a lump form, which deteriorate the toughness and heat cracking resistance, while incurring a welding cracking tendency. Molybdenum tends to combine with carbon to produce carbide of high hardness and increases tempering-softening resistance, thereby improving wear resistance at an elevated temperature. If the molybdenum content is no more than 0.2%, then there may not be expected such advantages. Conversely, if molybdenum content exceeds 3.0%, then it presents excessively high hardness, with the resulting embrittlement. In addition, the machinability will be much impaired.

As is apparent from the foregoing, the range of the composition of a deposited metal has been determined, considering the roll characteristics and weldability of a deposited metal. The range of the composition of a deposited metal according to the process of the invention should preferably be from 2.0 to 2.4% C, from 0.5 to 0.7% Si, from 0.5 to 0.7% Mn, from 1.0 to 2.0% Cr, from 1.0 to 1.5% Mo, and from 0.5 to 1.0% V (if added).

Meanwhile, the prior art cast and forged rolls are subjected to diffusion annealing or normalizing annealing to improve the cast structure and uniformity of the composition. In contrast thereto, according to the present invention, since the structure of the roll is atomized due to the rapid solidification according to the electro-slag welding, there may be saved such high temperature annealing, but mechanical properties are superior to those obtained in the forged roll, merely be resorting to tempering treatment for stress relieving and adjustment of hardness at a temperature of 500° to 700° C after welding. Since the roll produced according to the process of the present invention is used for hot rolling, the surface of the roll at the time of rolling is heated to a temperature of 500° to 700° C due to the contact with the material being rolled. Accordingly, the tempering temperature is set to a temperature as low as less than 500° C, then the surface of the roll will be tempered during its service and hence wear will takes place. In addition, there is least reduction in residual stress, so that there is a danger of breakage taking place due to the influence of the accompanying thermal stress introduced during its service. For those reasons, the tempering temperature should be no less than 500° C. However, if tempering temperature exceeds 700°C, then the toughness will be improved but the hardness will be lowered instead, so that the wear resistance is deteriorated. Thus, the tempering temperature should be limited to no more than 700° C.

As is apparent from the foregoing, the aforesaid composition have been determined for affording to a deposited metal desired weldability and roll characteristics when building up a deposited metal on the surface of the roll made of steel based Adamite having a high carbon content such as from 1.5 to 2.5%. For improving the characteristics of a deposited metal of high carbon content Adamite, it is a must that the structure of the deposited metal be atomized and the range of the cooling rate of a deposited metal be limited.

Figure 7:
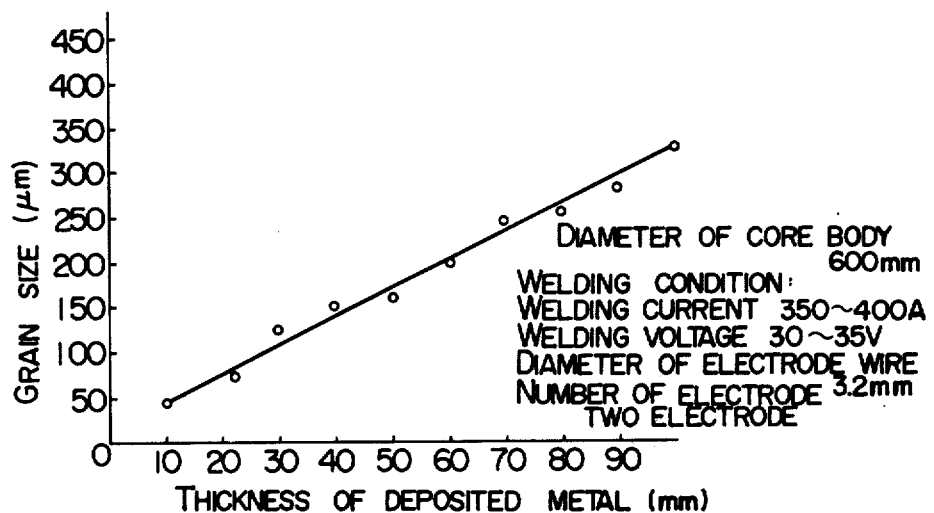
FIGS. 7 and 8 are plots illustrating the relationship between the thickness of deposited metals and the grain sizes of crystals.
Figure 8:
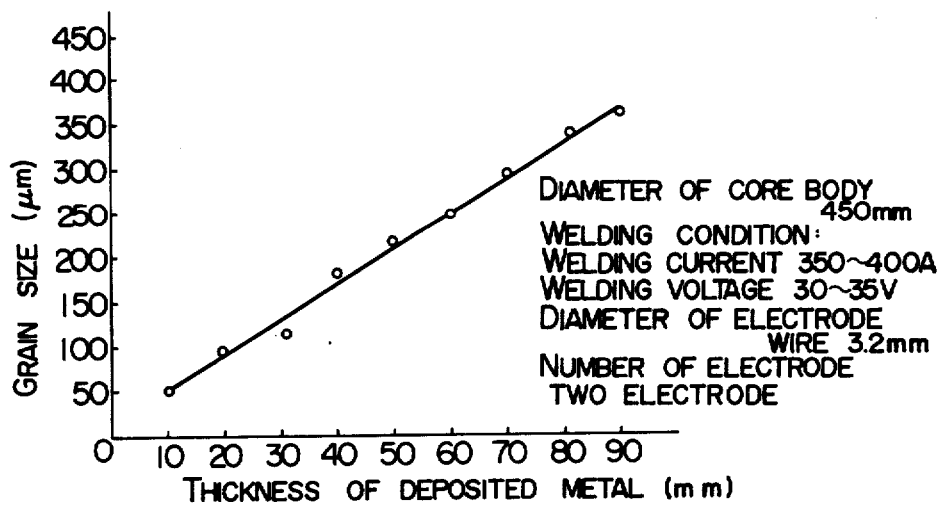

FIG. 7 and 8 shows the results of tests, illustrating the relationship between the radial thickness of deposited metal and the size of crystal grain. In other words, it was found that when the radial thickness of a deposited metal is less than 1/10 of the original diameter of a core body, the size of the crystal grains produced is over 200 μm. However, when the radial thickness of the deposited metal is less than 20 mm, then the consumable electrode will contact the core body, resulting in a failure to achieve a steady welding operation. Therefore in accordance with the build-up welding procedure of the present invention, as long as the radial thickness of a deposited metal is over 20 mm but less than 1/10 of the diameter of a core body, there may be achieved an atomized structure, and thus excellent roll characteristics may be obtained.

The reason why the size of crystal grain obtained according to the electro-slag welding is so fine, as compared with those obtained in forged or cast roll, is that a consumable electrode is melted in molten slag and then absorbed into the core body as well as in the wear cooling copper plate, without being exposed to atmosphere, followed by rapid solidification.

A description will be given of the start-tab as used in the process according to the present invention in conjunction with FIGS. 12 through 15.

Figure 12:
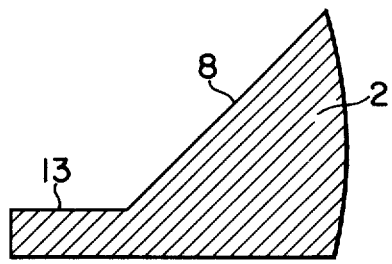
FIG. 12 is a cross-sectional view of a start-tab made of graphite, which is formed with a sloped surface.
Figure 13:
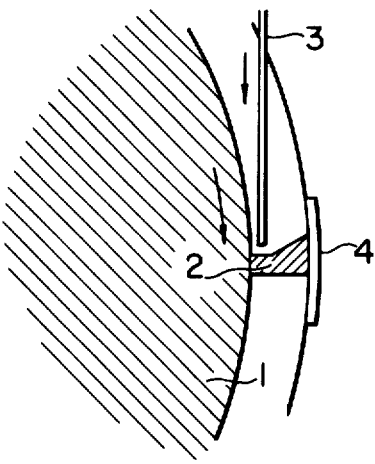
FIG. 13 is a cross-sectional view of a groove portion at the beginning of welding, when a start tab of FIG. 12 is used.
Figure 14:
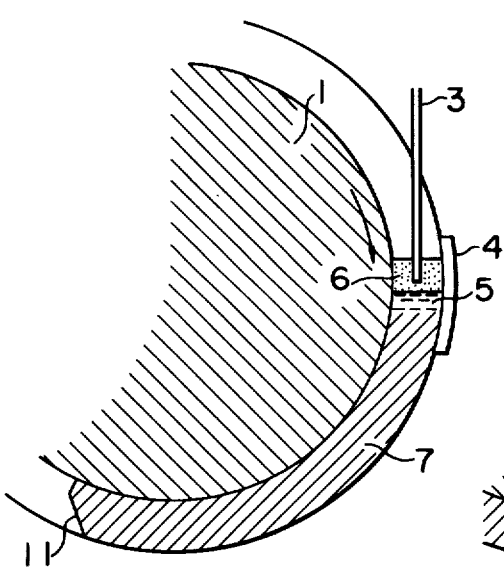
FIG. 14 is a cross-sectional view of a groove portion, when the welding has completed about ⅓ of its intended travel, by using the start-tab of FIG. 12.
Figure 15:
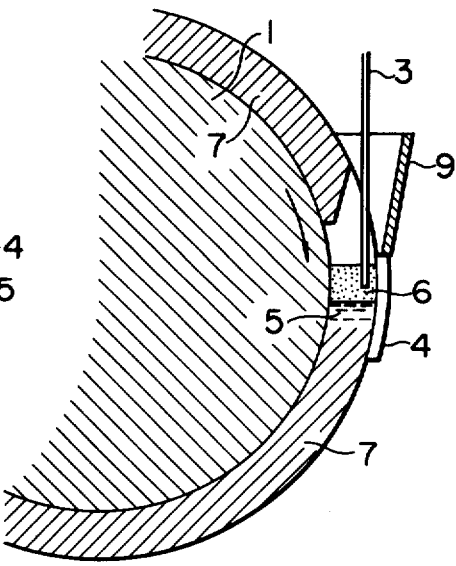
FIG. 15 is a cross-sectional view of a groove portion at the completion of welding, when the start tab of FIG. 12 is used.

As shown in FIG. 12, the start tab is formed with a bottom surface extending horizontally and the top inclined or sloped surface 8. The other portions of the start tab may be of any suitable configuration thus, in case start tab 2 is used, the configuration of the deposited metal in the welding starting portion will be such that a sloped surface 11 is directed in the counterclockwise direction as shown in FIG. 14. On the other hand, when building up the welding completing portion as shown in FIG. 15 after the rotation of the core body 1, there is used a copper plate 9 having a 'U' shaped cross section. In such a case, the sloped surface 11 of the deposited metal 7 aids in causing slag 6 to float upwards, thereby enhancing the soundness of the interior of a joint between deposited metals 7. Further, more, the start-tab 2 is made of graphite. The graphite has good electrical conductivity, so that there may be generated an arc between the tab and a consumable electrode wire as in the case of an iron start-tab. In addition, the graphite presents good peelability from the deposited metal 7, so that the start-tab 2 according to the present invention may be readily removed from the deposited metal 7. Since the start tab according to the present invention provides greater heat insulating effect as compared with the steel start-tab, it presents heat preserving effects in the initial stage of welding, thereby enhancing the penetration of a deposited metal 5 into the surface of the core body 1.

Figure 16:
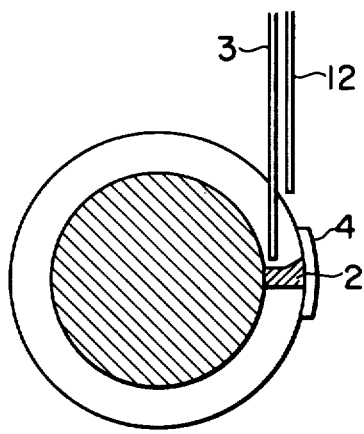
FIG. 16 is a cross-sectional view of a groove portion at the beginning of welding.
Figure 17:
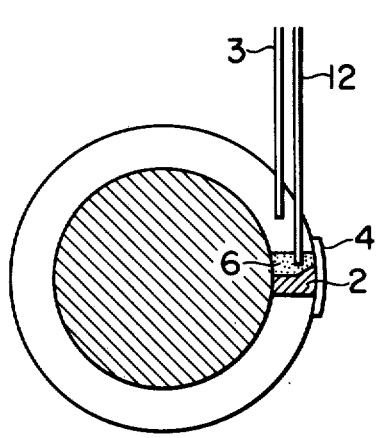
FIG. 17 is a cross-sectional view of a groove portion, when a non-consumable electrode is immersed into a molten slag at the beginning of welding.
Figure 18:
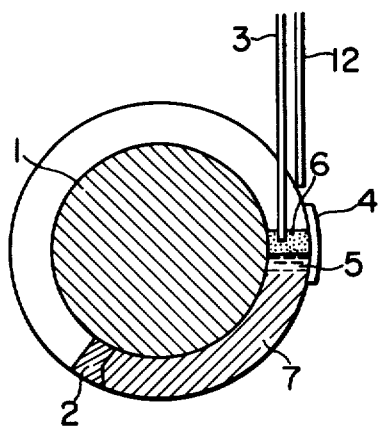
FIG. 18 is a cross-sectional view of a groove portion during welding, after the non-consumable elctrode has been removed from the molten slag.

Now, description will be turned to how to start the welding, in conjunction with FIGS. 16 through 18.

According to the present invention, an arc is generated between the consumable electrode wire 3 and the start tab 2 at the beginning of welding, as shown in FIG. 16, and then the flux added (not shown) is converted into molten slag due to the heat from the arc, after which the feed of the consumable electrode wire 3 is interrupted. Then, a non-consumable electrode 12 such as tungsten or graphite, as shown in FIG. 17, is inserted into the molten slag 6. The molten slag is maintained at a high temperature by the use of the non-consumable electrode 12. In this condition, the surface of the groove portion in the core body 1 is heated sufficiently by means of the molten slag 6. This prevents the improper fusion in the core body 1. Subsequently, the feed of the non-consumable electrode wire 3 is started again and then, as shown in FIG. 18, the non-consumable electrode 12 such as tungsten or graphite is removed from the molten slag 6. Thus, there may be achieved sufficient heating for the core body 1 and the like both at the beginning and at the completion of welding, so that there results complete fusion between the core body 1 and the deposited metal 7, thereby preventing welding defects such as cracking.

Meanwhile, the deposited metal 7 is obtained by using a composite wire, in which powder such as C, Si, Cr, Mo and the like are filled in a hoop, and the deposited metal 7 contains part of the composition of the core body 1, so that the composition of the powder of a composite wire is adjusted so as to provide a desired composition for deposited metal, considering the welding condition.

Description will be given of the examples of the process according to the present invention.

Figure 9:
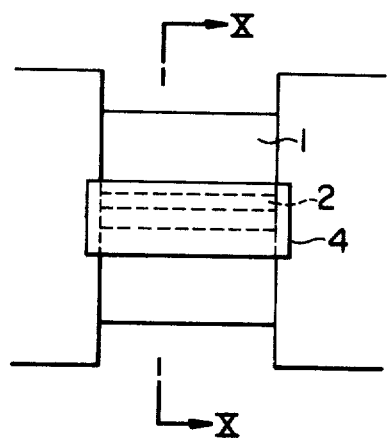
FIG. 9 is a front view of groove portions in a core body.
Figure 10:
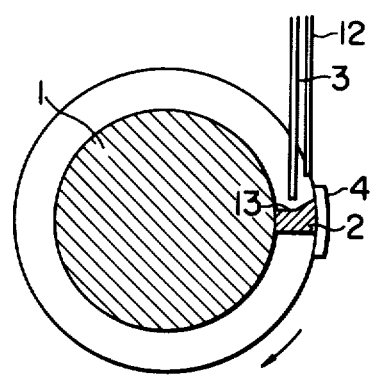
FIG. 10 is a cross-sectional view, taken along the line X—X of FIG. 9.
Figure 11:
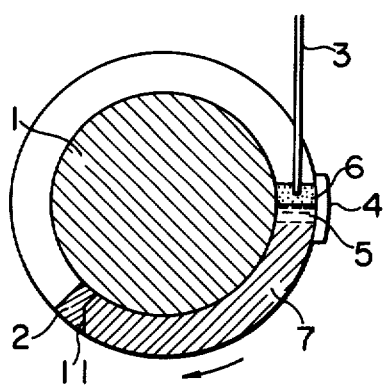
FIG. 11 is a cross-sectional view of a groove portion in the core body in the course of welding.

Firstly, as shown in FIGS. 9 and 10, the core body 1 is placed horizontally; a start-tab made of graphite, as shown in FIG. 12, is attached at a right angle to the surfaces of core bodies a, b, c shown in Table 1; an arc is generated between the flat portion 13 of the start tab 2 and the consumable electrode wire 3; and then the flux added (not shown) is converted into a molten slag 6 by the heat from an arc. Then, the feed of the consumable electrode wire 3 is interrupted; an electric current A of 20 V, 200 A is caused to flow for 10 seconds through the non-consumable electrode, whose tip has been immersed into the molten slag 6, so that the molten slag 6 is maintained at a high temperature due to the Joule's heat generated by the electric current flowing through the molten slag 6 by way of the non-consumable electrode 12, thereby heating the surfaces of the groove portions sufficiently. Then, the consumable electrode wire 3 is fed into the molten slag 6, so that the consumable electrode wire is melted due to the Joule's heat of an electric current flowing through the molten slag 6, as shown in FIG. 11, thereby obtaining molten metal 5. The molten metal 5 gives deposited metals 7 as shown in A through H in Table 2, under the influence of the cooling action of water-cooled copper plate 4 and core body 1. When the deposited metal is formed, then the start tab 2 is lightly tapped to be removed. With the rotation of the core body 1, when the deposited metal 7 is formed up to the position shown in FIG. 15, then a copper plate 9 is attached to the surface of the core body in a manner to encompass the consumable electrode wire 3 therewith, in the course of welding, for building up a deposited metal on the terminating portion of welding. Then, the molten slag 6 floats upwards along the sloped surface 11 of the deposited metal 7 and dwells within the copper plate 9, thereby completing the build-up welding.

Subsequently, the heat treatment is applied to the aforesaid Adamite roll at a temperature of 500° to 700° C for adjusting hardness and stress-relieving, and the groove portions are subjected to finishing, thus completing the production of a roll.

In connection to Tables 1 and 2, deposited metals A, E in TAble 2 are formed on a core body $a$ in Table 1, deposited metals B, F are formed on the core body $b$ and deposited metals C, D, G, H are formed on the core body $c$.

As can be seen from Table 2, it was found that the rolls A through H according to the present invention present mechanical properties superior to those of rolls obtained according to the prior art.

Figure 2:
FIG. 2 is a photograph of micro-structure of sample J in Table 2.

As shown in FIGS. 1 and 2, the micro-structures of Adamite roll (Table 2 B) according to the present invention is much finer than that of the roll (Table 2 J) which has been subjected to heat treatment and has substantially the same composition.

Figure 3:
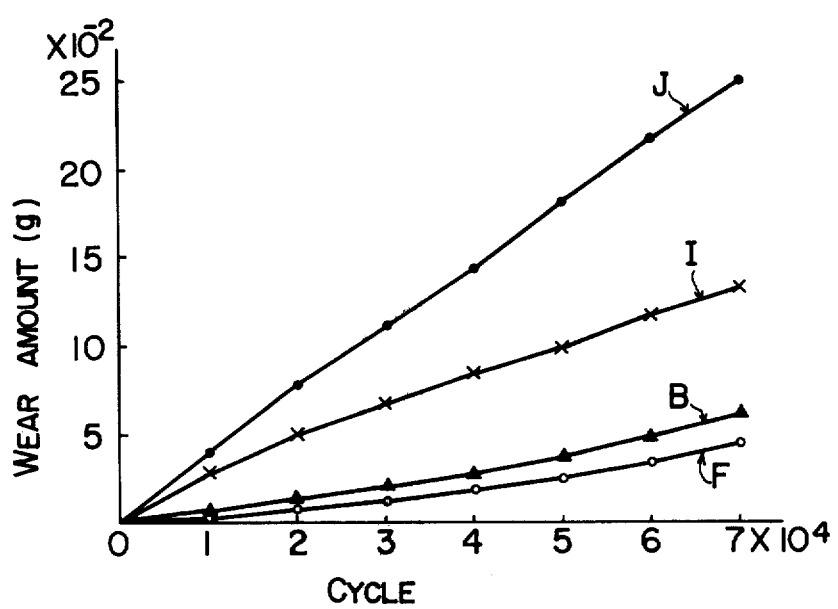
FIG. 3 is a plot illustrating the results of a wear resistance test.

As is best shown in FIG. 3, the rolls B, F according to the present invention present wear resistance about three to six times as high as that of the roll obtained according to the prior art.

Figure 4:
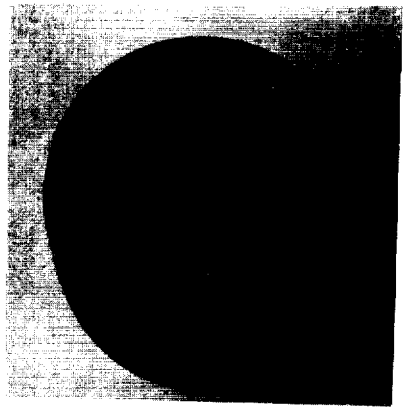
FIG. 4 is a photograph illustrating the results of a heat cracking test in sample B in Table 2.
Figure 5:
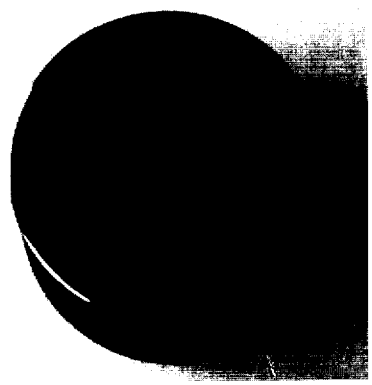
FIG. 5 is a photograph illustrating the results of a heat cracking test in sample I in Table 2.
Figure 6:
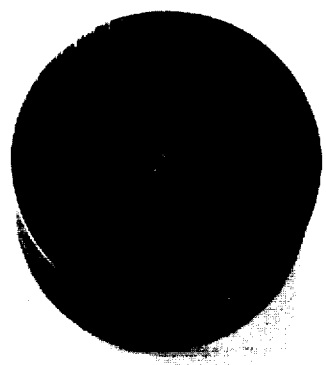
FIG. 6 is a photograph illustrating the results of a heat cracking test in a sample J in Table 2.

As shown in FIGS. 4 through 6, the rolls obtained according to the present invention are insusceptible to the heat cracking, as compared with the rolls obtained according to the prior art.

Alternatively, included by Adamite deposited metals containing from 1.5 to 2.5 % C according to the present invention is one which has a composition that is shown in Table 3 and contains an increased amount of Mn, Cr and the like in addition to Nb and W to thereby enhance the hardenability. In this case as well, the thickness of the build-up of the weld should be in the range from 20 mm to 1/10 of the original diameter of the core body.

Table 3

| | Welding Condition | | | Chemical Composition | | | | | | | | Hardness |
|---|---|---|---|---|---|---|---|---|---|---|---|---|
| | Current (A) | Voltage (V) | Speed (mm/min) | C | Si | Mn | Ni | Cr | Mo | Nb | W | (Hs) |
| K | 350 ±50 | 35–40 | 30 | 1.52 | 0.90 | 1.57 | — | 6.01 | 1.24 | 2.07 | 1.72 | 68 |
| L | " | " | " | 1.78 | 0.96 | 1.63 | — | 8.52 | 1.66 | 1.83 | 2.05 | 70 |
| M | " | " | " | 2.12 | 0.98 | 1.38 | — | 10.03 | 2.37 | 1.96 | 2.48 | 72 |
| N | " | " | " | 2.46 | 0.92 | 1.47 | — | 15.68 | 2.82 | 2.01 | 3.03 | 74 |

| Mechanical properties | | Size of crystal grain ($\mu$m) | Thickness of build-up (mm) | Heat treatment (° C × hr) |
|---|---|---|---|---|
| Tensile strength (kg/mm$^2$) | Elongation (%) | | | |
| 85 | 1.6 | 120 | 40 | 500 × 20 |
| 83 | 1.5 | " | " | " |
| 88 | 1.2 | " | " | " |
| 90 | 1.0 | " | " | " |

As has been described earlier, the superiority in roll characteristics of the roll obtained according to the present invention to those obtained according to the Table 1

| Core body No. | Dimensions of core body (mm) | Groove portion width × depth (mm) | Chemical Composition (%) | | | | | | Hardness |
|---|---|---|---|---|---|---|---|---|---|
| | | | C | Si | Mn | Ni | Cr | Mo | |
| a | 470° × 900ℓ | Box type 200 × 50 | 0.78 | 0.51 | 0.64 | 0.32 | 0.48 | 0.21 | 34 |
| b | 510° × 1300ℓ | Diamond type 215 × 70 | 1.20 | 0.47 | 0.78 | 0.41 | 0.70 | 0.19 | 40 |
| c | 540° × 1500ℓ | Box type 220 × 70 | 1.50 | 0.56 | 0.81 | 0.78 | 1.20 | 0.28 | 46 |

Table 2

| | Welding Condition | | | Chemical Composition | | | | | | | Hardness (Hs) | Mechanical Properties | | Size of crystal train ($\mu$m) | Thickness of build-up (mm) | Heat treatment (° C × hr) |
|---|---|---|---|---|---|---|---|---|---|---|---|---|---|---|---|---|
| | Current (A) | Voltage (V) | Speed mm/min | C | Si | Mn | Ni | Cr | Mo | V | | Tensile strength (kg/mm$^2$) | Elongation (%) | | | |
| A | 350 ±50 | 35–40 | 30 | 1.50 | 0.31 | 0.75 | — | 1.26 | 0.84 | — | 40 | 78 | 2.4 | 120 | 40 | 650×20 |
| B | " | " | " | 1.72 | 0.42 | 0.78 | — | 1.20 | 0.78 | — | 41 | 72 | 2.0 | " | " | " |
| C | " | " | " | 2.00 | 0.41 | 0.80 | — | 1.21 | 0.71 | — | 47 | 68 | 1.5 | " | " | " |
| D | " | " | " | 2.50 | 0.51 | 0.79 | — | 1.31 | 0.83 | — | 52 | 61 | 1.2 | " | " | 630×20 |
| E | " | " | " | 1.50 | 0.51 | 0.76 | — | 1.04 | 1.01 | 0.26 | 40 | 81.6 | 2.6 | " | " | 650×20 |
| F | " | " | " | 1.70 | 0.60 | 0.42 | — | 2.01 | 0.83 | 0.82 | 43 | 80 | 2.1 | " | " | " |
| G | " | " | " | 2.10 | 0.64 | 0.64 | — | 1.09 | 1.23 | 0.92 | 45 | 76 | 2.15 | " | " | " |
| H | " | " | " | 2.50 | 0.71 | 0.81 | — | 2.10 | 1.02 | 0.98 | 49 | 78 | 2.0 | " | " | " |
| I | Forging | | | 1.78 | 0.64 | 0.81 | 0.78 | 1.10 | 0.50 | — | 41 | 60 | 2.5 | 400 | — | 630×20 |
| J | Casting | | | 1.71 | 0.64 | 0.81 | 0.30 | 1.27 | 0.60 | — | 40 | 50 | 0.3 | 600 | — | " | prior art may be attributed to the facts that the microstructure is atomized and the mechanical properties are excellent, particularly in its elongation.

The efficacies and advantages of the process for producing a roll according to the present invention are as follows:

1. A roll having much finer micro-structure may be obtained, as compared with that of a roll obtained according to the prior art forging or casting.

2. As a result, there may be achieved a roll having superior war resistance to the roll produced according to the prior art forging or casting.

3. The mechanical properties of the roll according to the present invention are improved with the accompanying improved resistance to a heat cracking tendency.

Accordingly, the present invention may provide a roll and a process for producing same, which is excellent in wear resistance and resistance to heat cracking, thereby achieving a rolling yield or durability twice as much as that obtained by the roll produced according to the prior art. In addition, if there is a need to afford wear resistance and resistance against heat cracking to specific groove or grooves among a plurality of grooves in the roll, such specific groove or grooves may be built-up with a deposited metal according to the process of the present invention, thus the process of the present invention is highly evaluated in industries.

What is claimed is:

1. A process for producing a roll comprising horizontally arranging a core body made of a cast steel or steel based adamite and containing from 0.5 to 2.5% C, said core body having at least one circumferential groove in its circumferential surface; feeding a consumable electrode wire into at least one of said grooves while rotating said core body, to thereby obtain by electro-slag welding a metal build-up deposited over the surfaces of said at least one groove to fill same, said metal build-up containing, in weight percent, 1.5 to 2.5% C, 0.2 to 1.0% Si, 0.5 to 1.0% Mn, 0.5 to 3.0% Cr, and 0.2 to 3.0% Mo, the balance being essentially Fe and inevitable impurities: and subjecting the article so formed to heat treatment at a temperature ranging from 500° to 700°° C.

2. The process of claim 1, wherein said metal build-up contains V, the amount of V in said metal build-up being less than 2.0% V.

3. A process for producing a roll comprising horizontally arranging a core body made of a cast steel or steel based Adamite containing from 0.5 to 2.5% C, said core body having at least one circumferential groove in its circumferential surface; feeding a consumable electrode wire into at least one of said grooves while rotating said core body; and building up an Adamite deposited metal over the surfaces of said at least one groove, said Adamite deposited metal containing 1.5 to 2.5% C and being built-up by electro-slag welding to a radial thickness or from 20 mm to 1/10 of the original diameter of said core body.

4. A process for producing a roll by electro-slag-welding comprising using a start-tab having a top surface which is sloped upwards towards the outer circumference of said core body, as viewed in the transverse cross section of said core body, when starting welding, said start-tab being made of graphite.

5. A process for producing a roll by electro-slag-welding comprising converting flux into molten slag by using a consumable electrode wire at the beginning or completion of welding; then interrupting the feed of said consumable electrode wire; maintaining said molten slag at a high temperature for a given period of time by the use of non-consumable electrode; and thereafter proceeding with welding by the use of a consumable electrode wire 6. A process for producing a roll as defined in Claim 1, wherein the composition of said deposited metal or metals is 2.0 to 2.4% C, 0.5 to 0.7% Si, 0.5 to 0.7% Mn, 1.0 to 2.0% Cr, 1.0 to 1.5% Mo, and 0.5 to 1.0% V the balance being essentially Fe and inevitable impurities.

7. A process for producing a roll as defined claim 1, wherein the radial thickness of said deposited metal is from 20 mm to 1/10 of the original diameter of said core body.

8. A process for producing a roll as defined claim 2, wherein the radial thickness of said deposited metal is from 20 mm to 1/10 of the original diameter of said core body.

9. A process for producing a roll as defined claim 6, wherein the radial thickness of said deposited metal is from 20 mm to 1/10 of the original diameter of said core body.

10. A process for producing a roll as defined in claim 1, wherein said process further comprises: using a start-tab having a top surface which is sloped upwards towards the outer circumference of said core body, as viewed in the transverse cross section of said core body, when starting welding, said start-tab being made of graphite; converting flux into molten slag by using a consumable electrode wire at the beginning or completion of welding; interrupting the feed of said consumable electrode wire; maintaining said molten slag at a high temperature for a given period of time by the use of a non-consumable electrode such as tungsten or graphite; and proceeding with welding by the use of a consumable electrode wire, again.

11. A process for producing a roll as defined in claim 2, wherein said process further comprises the steps of: using a start tab having a top surface which is sloped upwards towards the outer circumference of said core body, as viewed in the transverse cross section of said core body, when starting welding, said start-tab being made of graphite; converting flux into molten slag by using a consumable electrode wire at the beginning or completion of welding; interrupting the feed of said consumable electrode wire; maintaining said molten slag at a high temperature for a given period of time by the use of a non-consumable electrode such as tungsten or graphite; and proceeding with welding by the use of consumable electrode wire, again.

12. A process for producing a roll as defined in claim 6, wherein said process further comprises: using a start-tab having a top surface which is sloped upwards towards the outer circumference of said core body, as viewed in the transverse cross section of said core body, when starting welding, said start-tab being made of graphite; converting flux into molten slag by using a consumable electrode wire at the beginning or completion of welding; interrupting the feed of said consumable electrode wire; maintaining said molten slag at a high temperature for a given period of time by the use of a non-consumable electrode such as tungsten or graphite; and proceeding with welding by the use of a consumable electrode wire, again.

13. A process for producing a roll as defined in claim 3, wherein said process further comprises: using a start-tab having a top surface which is sloped upwards towards the outer circumference of said core body as viewed in the transverse cross section of said core body, when starting welding, said start-tab being made of graphite; converting flux into molten slag by using a consumable electrode wire at the beginning or completion of welding; interrupting the feed of said consumable electrode wire; maintaining said molten slag at a high temperature for a given period of time by the use of a non-consumable electrode such as tungsten or graphite; and proceeding with welding by the use of a consumable electrode wire, again.

14. A process for producing a roll as defined in claim 7, wherein said process further comprises: using a start-tab having a top surface which is sloped upwards towards the outer circumference of said core body as viewed in the transverse cross section of said core body, when starting welding, said start-tab being made of graphite; converting flux into molten slag by using a consumable electrode wire at the beginning or completion of welding; interrupting the feed of said consumable electrode wire; maintaining said molten slag at a high temperature for a given period of time by the use of a non-consumable electrode such as tungsten or graphite; and proceeding with welding by the use of a consumable electrode wire, again.

15. A proces for producing a roll as defined in claim 8, wherein said process further comprises using a start-tab having a top surface which is sloped upwards towards the outer circumference of said core body as viewed in the transverse cross section of said core body, when starting welding, said start-tab being made of graphite; converting flux into molten slag by using a consumable electrode wire at the beginning or completion of welding; interrupting the feed of said consumable electrode wire; maintaining said molten slag at a high temperature for a given period of time by the use of a non-consumable electrode such as tungsten or graphite; and proceeding with welding by the use of a consumable electrode wire, again.

16. A process for producing a roll comprising horizontally arranging a core body made of a cast steel or steel based Adamite and containing from 0.5 to 2.5% C, said core body having at least one circumferential groove in its circumferential surface; depositing in said at least one circumferential groove by electro-slag welding a metal consisting essentially of by weight 1.5 to 2.5% C, 0.2 to 1.0% Si, 0.5 to 1.0% Mn, 0.5 to 3.0% Cr and 0.2 to 3.0% Mo, the balance being essentially Fe and inevitable impurities; and subjecting the articles so formed to heat treatment at a temperature of from 500° to 700° C.

17. The process of claim 16, wherein said metal contains V, the amount of V in said metal being less than 2.0%.

18. The process of claim 17, wherein the radial thickness of the metal deposited in said at least one groove is from 20 mm to 1/10 of the original diameter of said core body.

19. The process of claim 18, wherein electro-slag welding is accomplished by: placing a start-tab into said at least one groove, said start-tab having a top surface sloping upwards towards the outer circumference of said core body as viewed in the transverse cross section of said core body when welding is initiated; initiating welding by generating an arc between said consumable electrode wire and said start-tab, the heat from said arc converting flux in said at least one groove to molten slag; interrupting the arc between said consumable electrode wire and said start-tab after said flux becomes molten; maintaining said molten slag at a high temperature for a predetermined period of time by the use of a non-consumable electrode; and thereafter proceeding with welding by using said consumable electrode wire.

20. The process of claim 19, wherein said non-consumable electrode is withdrawn from contact with said slag after welding proceeds with the use of said consumable electrode wire, said non-consumable electrode being formed from tungsten or graphite.

21. The process of claim 17, wherein electro-slag welding is accomplished by: placing a start-tab into said at least one groove, said start-tab having a top surface sloping upwards towards the outer circumference of said core body as viewed in the transverse cross seciton of said core body when welding is initiated; initiating welding by generating an arc between said consumable electrode wire and said start-tab, the heat from said arc converting flux in said at least one groove to molten slag; interrupting the arc between said consumable electrode wire and said start-tab after said flux becomes molten; maintaining said molten slag at a high temperature for a predetermined period of time by the use of a non-consumable electrode; and thereafter proceeding with welding by using said consumable electrode wire.

22. The process of claim 21, wherein said non-consumable electrode is withdrawn from contact with said slag after welding proceeds with the use of said consumable electrode wire, said non-consumable electrode being formed from tungsten or graphite.

23. The process of claim 16, wherein said metal consists essentialy of 2.0 to 2.4% C, 0.5 to 0.7% Si, 0.5 to 0.7% Mn, 1.0 to 2.0% Cr, 1.0 to 1.5% Mo, and 0.5 to 1.0% V, the balance being essentially iron and inevitable impurities.

24. The process of claim 23, wherein the radial thickness of the metal deposited in said at least one groove is from 20 mm to 1/10 of the original diameter of said core body.

25. The process of claim 24, wherein electro-slag welding is accomplished by: placing a start-tab into said at least one groove, said start-tab having a top surface sloping upwards towards the outer circumference of said core body as viewed in the transverse cross section of said core body when welding is initiated; initiating welding by generating an arc between said consumable electrode wire and said start-tab, the heat from said arc converting flux in said at least one groove to molten slag; interrupting the arc between said consumable electrode wire and said start-tab after said flux becomes molten; maintaining said molten slag at a high temperature for a predetermined period of time by the use of a non-consumable electrode; and thereafter proceeding with welding by using said consumable electrode wire.

26. The process of claim 25, wherein said non-consumable electrode is withdrawn from contact with said slag after welding proceeds with the use of said consumable electrode wire, said non-consumable electrode being formed from tungsten or graphite.

27. The process of claim 16, wherein the radial thickness of said deposited metal is from 20 mm to 1/10 of the original diameter of said core body.

28. The process of claim 27, wherein electro-slag welding is accomplished by: placing a start-tab into said at least one groove, said start-tab having a top surface sloping upwards towards the outer circumference of said core body as viewed in the transverse cross section of said core body when welding is initiated; initiating welding by generating an arc between said consumable electrode wire and said start-tab, the heat from said arc converting flux in said at least one groove to molten slag; interrupting the arc between said consumable electrode wire and said start-tab after said flux becomes molten; maintaining said molten slag at a high temperature for a predetermined period of time by the use of a non-consumable electrode; and thereafter proceeding with welding by using said consumable electrode wire.

29. The process of claim 28, wherein said non-consumable electrode is withdrawn from contact with said slag after welding proceeds with the use of said consumable electrode wire, said non-consumable electrode being formed from tungsten or graphite.

30. The process of claim 16, wherein electro-slag welding is accomplished by: placing a start-tab into said at least one groove, said start-tab having a top surface sloping upwards towards the outer circumference of said core body as viewed in the transverse cross section of said core body when welding is initiated; initiating welding by generating an arc between said consumable electrode wire and said start-tab, the heat from said arc converting flux in said at least one groove to molten slag; interrupting the arc between said consumable electrode wire and said start-tab after said flux becomes molten; maintaining said molten slag at a high temperature for a predetermined period of time by the use of a non-consumable electrode; and thereafter proceeding with welding by using said consumable electrode wire.

31. The process of claim 30, wherein said non-consumable electrode is withdrawn from contact with said slag after welding proceeds with the use of said consumable electrode wire, said non-consumable electrode being formed from tungsten or graphite.

32. A process for producing a roll comprising: horizontally arranging a core body made from a cast steel or steel based Adamite containing from 0.5 to 2.5% C, said core body having at least one circumferential groove in its circumferential surface; and depositing by electro-slag welding sufficient metal to fill said at least one groove, said metal containing 1.5 to 2.5% C by weight, the radial thickness of the metal in said groove being from 20 mm to 1/10 of the original diameter of said core body.

33. The process of claim 32, wherein said core body is rotated during deposition of said metal in said at least one groove, a consumable electrode wire being fed to said at least one groove during deposition of said metal.

34. The process of claim 33, wherein electro-slag welding is accomplished by: placing a start-tab into said at least one groove, said start-tab having a top surface sloping upwards towards the outer circumference of said core body as viewed in the transverse cross section of said core body when welding is initiated; initiating welding by generating an arc between said consumable electrode wire and said start-tab, the heat from said arc converting flux in said at least one groove to molten slag; interrupting the arc between said consumable electrode wire and said start-tab after said flux becomes molten; maintaining said molten slag at a high temperature for a predetermined period of time by the use of a non-consumable electrode; and thereafter proceeding with welding by using said consumable electrode wire.

35. The process of claim 34, wherein said non-consumable electrode is withdrawn from contact with said slag after welding proceeds with the use of said consumable electrode wire, said non-consumable electrode being formed from tungsten or graphite.

36. In an electro-slag welding process for depositing a metal into a circumferential groove in the circumferential surface of a core body in which (1) a start-tab is inserted into said circumferential groove, (2) electro-slag welding is initiated by generating an arc between a consumable electrode wire and said start tab, (3) electro-slag welding is continued by feeding a consumable electrode to said groove and rotating said core body, and (4) said start-tab is removed from said groove prior to termination of electro-slag welding, the improvement wherein said start-tab defines a top surface, said top surface sloping upwardly toward the outer circumference of said core body as viewed in the transverse cross section of said core body when electro-slag welding is initiated, said start-tab being made from graphite.

37. In an electro-slag welding process for depositing a metal into a circumferential groove in the circumferential surface of a core body in which (1) a start-tab is inserted into said circumferential groove, (2) electro-slag welding is initiated by generating an arc between a consumable electrode wire and said start-tab, flux adjacent said arc being converted into molten slag by the heat produced by said arc, and (3) electro-slag welding is continued by rotating said core body and feeding further consumable electrode wire to said circumferential groove, the improvement for preventing improper fusion of metal in said groove at the initial stage of electro-slag welding comprising withdrawing said consumable electrode wire from said slag after said flux is converted into molten slag, maintaining the molten slag at a high temperature for a time sufficient to prevent improper fusion during the initial stage of electro-slag welding by the use of a non-consumable electrode, and thereafter proceeding with electro-slag welding by the use of said consumable electrode wire.

38. The process of claim 37, wherein said non-consumable electrode is made of tungsten or graphite.

39. A roll comprising a core body of a cast steel-based Adamite containing from 0.5 to 2.5% C, said core body having at least one circumferential groove in its circumferential surface, and a deposited metal build-up over the surfaces of said at least one groove, said deposited metal build-up being produced by electro-slag welding and consisting essentially of by weight 1.5 to 2.5% C, 0.2 to 1.0%, Si, 0.5 to 1.0% Mn, 0.5 to 3.0% Cr and 0.2 to 3.0% Mo, the balance being essentially Fe and inevitable impurities, said deposited metal having been subjected to a heat treatment at a temperature between 500° and 700° C.

40. The roll of claim 39, wherein said deposited metal further contains vanadium, the amount of vanadium in said deposited metal being less than 2.0%.

41. The roll of claim 40, wherein said deposited metal has a radial thickness of from 20 mm to 1/10 of the original diameter of said core body.

42. The roll of claim 39, wherein said deposited metal consists essentially of 2.0 to 2.4% C, 0.5 to 0.7% Si, 0.5 to 0.7% Mn, 1.0 to 2.0% Cr, 1.0 to 1.5% Mo, and 0.5 to 1.0% Va, the balance being essentially iron and inevitable impurities.

43. The roll of claim 42, wherein said deposited metal has a radial thickness of from 20 mm to 1/10 of the original diameter of said core body.

44. The roll of claim 39, wherein said deposited metal has a radial thickness of from 20 mm to 1/10 of the original diameter of said core body.

45. A roll comprising a core body made of a cast steel or steel-based Adamite containing 0.5 to 2.5% C, said core body having at least one circumferential groove in its circumferential surface, and a deposited metal build-up on the surfaces of said at least one groove, said deposited metal build-up being produced by electro-slag welding and containing 1.5 to 2.5% C, said deposited metal build-up having a radial thickness of 20 mm to 1/10 of the original diameter of said core body.

* * * * *